Nov. 15, 1960
C. W. MADSON
2,959,973
CASTERING OF ROLLERS USED IN TOROIDAL
VARIABLE RATIO TRANSMISSIONS
Filed Feb. 11, 1959
2 Sheets-Sheet 1
Fig 1
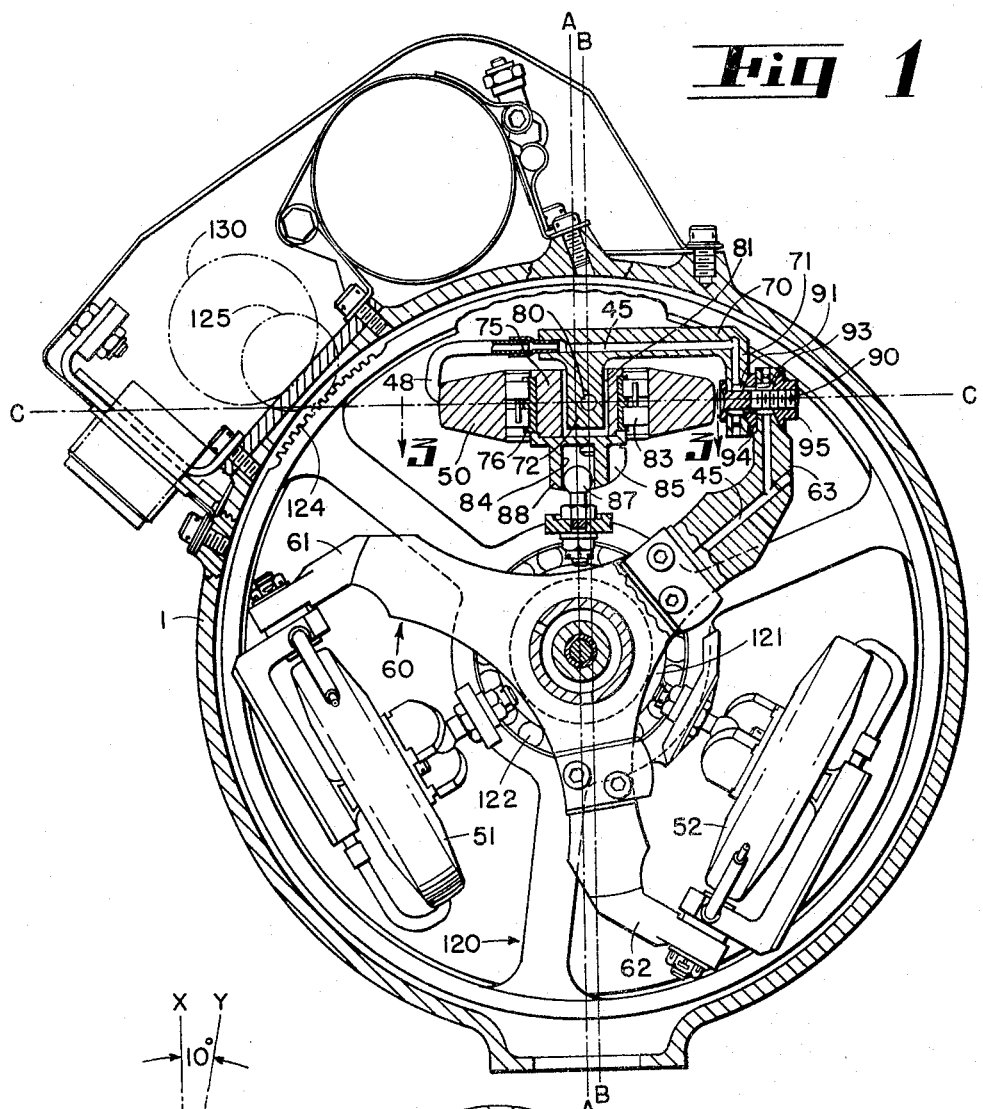
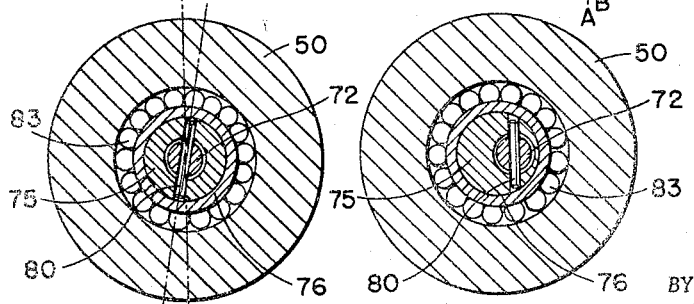
Fig 4   Fig 3
INVENTOR.
CHRIS W. MADSON.
BY
*Alden D. Redfield*
*Maurice W. Seeley*
ATTORNEYS.

United States Patent Office 2,959,973
Patented Nov. 15, 1960

2,959,973

CASTERING OF ROLLERS USED IN TOROIDAL VARIABLE RATIO TRANSMISSIONS

Chris W. Madson, Orange, Conn., assignor to Avco Manufacturing Corporation, Lycoming Division, Stratford, Conn., a corporation of Delaware Filed Feb. 11, 1959, Ser. No. 792,567

4 Claims. (Cl. 74—200)

This invention relates to an improvement in the roller positioning system for effecting a change in the drive ratio between the input and output of opposed toroid friction disks, and more particularly, to a means for castering of such rollers to achieve superior control over these driving elements.

The speed ratio change mechanism of the type to which this improvement is applicable generally employs a combination including opposed, grooved toroidal friction disks which have interposed therebetween friction wheels or rollers transmitting the drive from one disk to its complementary opposite disk. Such wheels or rollers ride in the grooves provided in each of the disk and thus transmit power through frictional force from one toroid to the other.

The referred to grooves which are formed in each of the opposed disks are annular grooves of circular cross-section formed in the opposed faces of the disks. The intermediate torque transmitting rollers are adjustable, in the embodiments of the invention here considered, in two different planes of movement. By this adjustability a variation in the speed ratio between disks is obtained. When the rollers are positioned right angularly with respect to the plane of rotation of the disks, the gear ratio is 1:1, whereas if the vertical disposition of the rollers is angularly deviated, the driving disk may drive the intermediate rollers nearer its circumsference with such rollers contacting the driven disk nearer its axis of rotation. In this instance the result is to increase the speed ratio between the disks whereas with an angular deviation in an opposite direction, where the rollers contact the driving toroidal disk nearer its axis of rotation and the driven toroid nearer its circumference, a reduced speed ratio is accomplished.

A plurality of these friction rollers are employed and these are mounted not only for rotation about their axes for effecting drive, but also, as just suggested, for tilting movement in a plane coincident with the axis of rotation of the disks. They are also supported for movement angularly to this axis for steering the disks. Such steering movement results in the tilting effect through a "climbing" or "floating" responsive movement of the disks, and the latter alters the drive ratio between the input and output torodial friction disks.

The foregoing outlines the general nature of the mechanism to which the instant invention is applicable. The salient feature of this improvement lies in the peculiar type of mounting for each of the described rollers, the same being journaled upon appropriate king pins or axles which are castered in one of two optional directions. This castering effect involves many inherent advantages conductive to smoother and more efficient drive between the input and output toroid of the assembly.

Those skilled in the art will fully appreciate that in transmissions of the type herein contemplated much difficulty has been encountered in compensating for imperfect operation due to slight misalignment or improper tolerances. Furthermore, the involved frictional forces between the opposed toroids necessarily involve close manufacturing tolerances with close assembly alignments. In the past, such frictional forces have tended to induce wobble of the interposed rollers between toroids and to retard the desired performance of the rollers, i.e., satisfactory following of each of the toroids in the path of the others. In addition, although control devices are known for deviation of the tilt angle of individual rollers in order to change the gear ratio between toroids, such often call for control mechanisms more cumbersome than necessary and hence, involving additional and undesirable weight to the entire assembly.

Accordingly, it is a primary purpose of this invention to provide a roller mounting means which improves performance of the friction rollers by taking advantage of the desirable effects flowing from a properly castered mounting. In the instant case this effect can be obtained by an offset of the king pin with respect to the center of the roller, or alternatively, the said king pin can be tilted about the center of the roll. In the former instance, the offset leads the direction of rotation of the input toroid with respect to the roller center; with respect to the castering tilt, such may be in either direction about the roller center.

It is a further object of the invention to provide a castering mount for the rollers intermediate the toroids which makes it possible to primarily control or steer only one roll of the several utilized, with the result that the others are speed sensitive and follow it. This reduces over-all control forces and eliminates the necessity for close manufacturing tolerances and close assembly alignments between each roller controlling medium.

Another objective of the invention is to provide a roller supporting means, exerting the effects of a castered mount, of such characteristics as to permit that simplicity of construction conducive to fabrication of smaller control units. This is achieved with an over-all increase in operative efficiency.

Other objects and advantages of the instant invention will be apparent from the following more detailed description herein, and involving reference to a number of illustrative figures of the invention, wherein:

Figure 1 is a front elevation view of one embodiment of the invention with certain parts thereof in section and with one of the toroids removed;

Figure 3 is a section view taken on the line 3—3 of Figure 1, further illustrating the embodiment of the invention shown in that figure; and Figure 4 is a section view similar to Figure 3 but showing a modified version of the invention wherein the king pin of the mounting means is tilted about the center of the roll.

Figure 2:
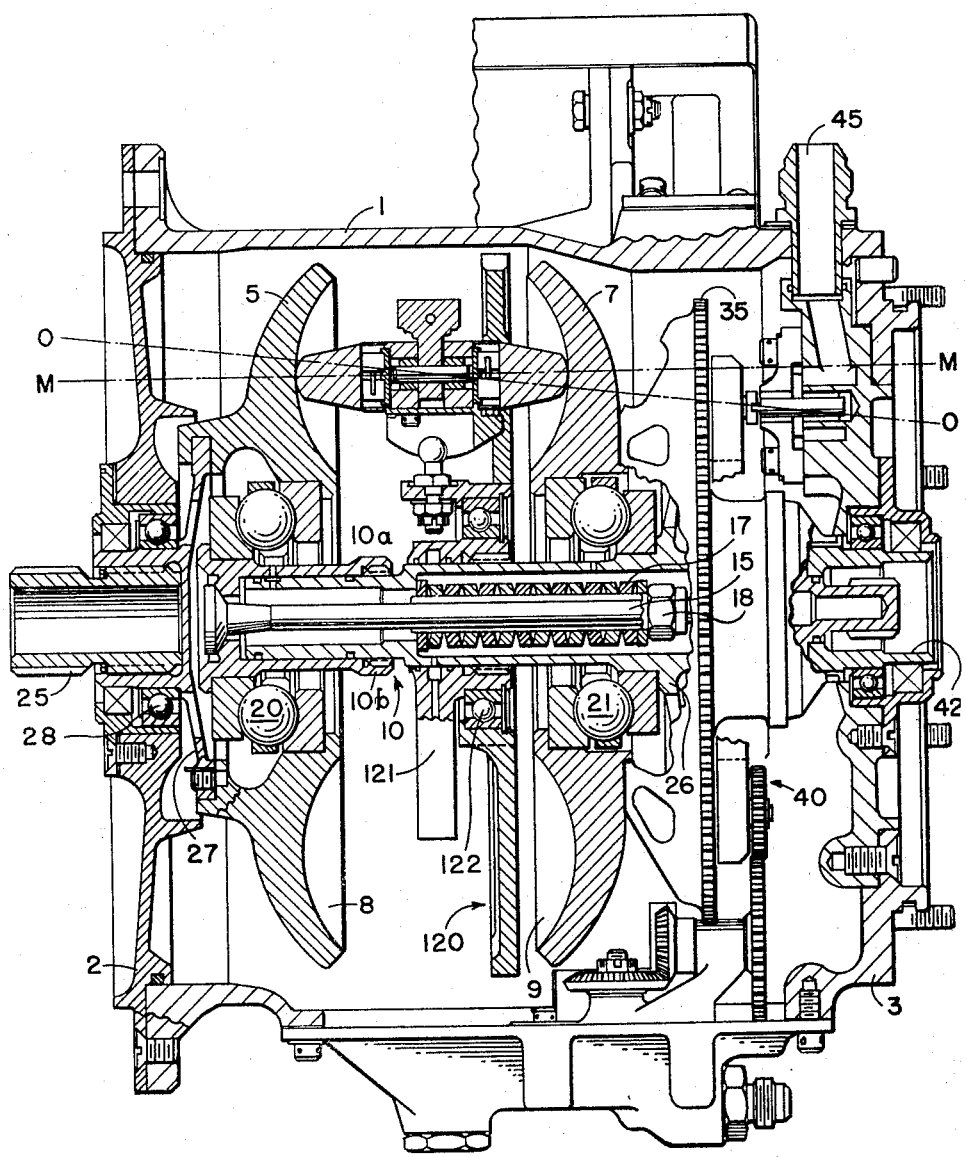
Figure 2 is a vertical axial section view of the embodiment of the invention illustrated in Figure 1 and further showing the relative location of the roller elements and opposed toroidal disks.

The entire transmission assembly in the embodiment herein described is positioned within a tubular casing 1 provided upon each side with customary circular side walls 2 and 3. The toroidal disks are represented at 5 and 7, respectively (Figure 2), and mounted as shown in opposed fashion for reception therebetween of the several driving rollers. In this instance the driving toroid is indicated at 5 and the driven toroid 7 mounted exactly opposite thereto. Each toroid is provided with grooves 8 and 9 respectively, the latter being semi-circular in cross-section and of exactly the same spherical shape. Together these grooves form a circular toroidal cross-section.

The driving toroid disk 5, or input disk 5, through the intermediate driving rollers, delivers torque to the output toroid 7. Both elements are mounted upon a common stationary shaft generally indicated at 10 and composed of two shaft elements, one of which, 10a, is adapted to interfit into a bore of complementary size in the other shaft, 10b. These two shaft elements upon which the toroids rotate are thus telescopically interfitted and when the intermediate friction rollers are placed therebetween, the same may be compressed together between the disks by means of a load bolt 15 positioned as shown, for example, in Figure 2. Both shaft components as just described are securely mounted to the main casing 1 in any suitable manner as by a spider element 26 which may be formed as an integral part of the main shaft unit 10a. The load bolt 15 is provided with a series of coned disks 17 which afford some elasticity to the compressive forces exerted against the rollers and which also permit constant contact pressure without substantial variation. The amount of pressure exerted by the load bolt 15 is regulated by the nut 18 which may be taken up to the desired extent for this purpose.

Each of the toroids rotate freely upon this fixed axle or shaft 10 by means of roller bearing assemblies 20 and 21, the latter in effect being of a type to function also as thrust bearings.

The input shaft 25 of this unit is directly secured, as stated, to a circular member or spider element 27. The latter is in turn affixed to the input toroid 5 in any suitable manner so that shaft and toroid rotate together, the shaft also being journaled in suitable ball bearing assemblies 28. These latter assemblies are positioned within the end circular member 2.

From the foregoing it is seen that power is transmitted from the input shaft 25 to toroid 5, through the intermediate rollers, to output toroid 7 and thence to an appropriate gear train, the first gear 35 of which is secured in any suitable manner to the output toroid 7. This gear 35 is arranged to drive a common form of gear reduction transmission such as a planetary gear arrangement generally indicated at 40. The various gear elements form no part of this invention, and are well known in the art, it being only necessary to point out that ultimately torque is delivered to the output shaft 42. The oil system for supplying oil to the toroidal disks and intermediate wheels is obtained through the various lines 45 which ultimately terminate in spouts 48 that feed directly into the path of the individual roller elements.

Transmission of power from one toroid to the other is attained through three equally spaced roller elements 50, 51 and 52 (Figure 1). Each of these rollers as well as the supports and controls for the same is fabricated in precisely the same manner and hence, a description of one will suffice as a description of all three. Thus in the various figures the roller here particularly described is indicated at 50 and shown in section in all of the several views.

As viewed in Figure 2 of the drawings, a 1:1 ratio exists between the input and output toroids by reason of the fact that that roller is at its intermediate point or position, i.e., the contact of the periphery of the roller with the opposed toroidal surfaces is the same distance from the center of rotation of the input toroid 5 as it is from the rotation center of the output toroid 7. Stated differently, the roller at a 1:1 ratio position operates in a plane of rotation which is vertical, or normal, to the plane of rotation of the opposed toroids.

The referred to three rollers are each mounted in identical fashion upon a triangular support member generally indicated at 60 and having three separate arms 61, 62 and 63. Referring particularly to the support for only one of the wheels, i.e., roll 50, it is seen that the arm 63, through a king pin arrangement to be described in more detail later, in turn interconnects with a support arm 70. The latter has a right angular member or shaft 72 upon which the cam body 75 is mounted, this cam body being circumferentially fitted with a bearing surface 76. A king pin 80, right angularly disposed to the shaft 72, is mounted within an appropriate aperture in the latter, this king pin permitting limited steering movement of the roller, there being a sufficient clearance 81 between the cam body and the member or shaft 72 to achieve this function. The roller 50, typical of the others, is journaled upon the cam body 75, suitable anti-friction roller bearings 83 being interposed between wheel and cam body. A cam slot 84, adapted to receive the steering button 87, can be made integral with the journal or bearing surface 76. The cam consists of two parallel and spaced-apart members 85 and 88, and as viewed in Figure 1, such cam, when the wheel is in the position of a 1:1 ratio, is angularly inclined to a plane extending vertically between the two toroids.

The fundamental operation of the apparatus described in the foregoing, in order to change the speed ratio between toroids, may be briefly described as follows: a steering of the roll from an assumed mid-point line to a position angled with respect to such line is a movement in a clockwise direction. The lefthand edge of the roller will thus be moved upward and the right-hand edge thereof downward (Figure 1). Thus, the roll 50 changes its plane of rotary movement. This constitutes the referred to "steering action," directional steering in this manner being promptly followed by a tilt of the roller due to the consequent tracking or floating thereof along the curved toroidal grooves. In counter-distinction to this steering action, the tilting here referred to is angular to a plane perpendicular to the opposed faces of the two toroids.

This tilting movement, accomplishing change in drive ratio between toroids, is illustrated diagrammatically in Figure 2 where the roller is positioned along the line M—M in a 1:1 speed ratio position. The angle of tilt is here shown as the angle between line M—M and the line O—O, the final position of angularity. It is now seen that when the roller has floated to the position O—O, the same is in contact with a larger diameter, on the input toroid 5 and a smaller diameter of the output toroid 7. The result is to drive the output at greater speed than the input and hence, the described arrangement permits an infinite and continuous number of gear ratio changes.

A movable support for the arm 70 is formed in the pin 90 which is positioned through a suitable aperture 91 in the right angular portion 71 of the wheel supporting arm 70. The aperture 91 is made larger than necessary in order to accommodate oil flow from the bore 45 through the resultant clearance 93, and then ultimately into and through the support 70. This assembly of the pin 90 is such as to permit angular movement of the leg 70 with respect to the arm 63. This is accomplished by means of a spherical washer 94 and a spherical nut 95. One side of the washer 94 is flat as indicated in Figure 1, so as to permit its firm seating within an appropriate depression formed in the end of the arm 63. The washer is provided with the referred to clearance 93 for the purpose above described. The opposite face of the washer, as already indicated above, is of spherical contour, i.e., representing a spherical segment, and it is positioned within a concave depression, spherical in configuration and identically matching the spherical face of the washer 94. The spherical nut 95, as also seen in Figure 1, is similarly formed with a contacting face having a configuration of a spherical segment. Such contacting face is adapted to seat, within suitable tolerances, within a complementary concavity formed upon the opposite side of the leg 63. The right angular portion 71 of the supporting arm 70 and the leg 63 are thus affixed together in such fashion as to permit movement between the described and contacting spherical faces of washer and nut on the one hand and the member 71 and leg 63 on the other. The described elements are maintained in the position shown by the spherical nut 95 which is threaded upon the end of the king pin 90, and turned to the desired rigidity between element 71 and member 63. Such relationship will be set up in such fashion as to maintain a relatively rigid support for the roller 50, yet at the same time permit deviation of the axis of the king pin 90 and hence, deviation of the arm 70.

It is further important to note that the longitudinal axis of the pin or pivot 90 is in exact alignment with a plane bisecting the geometrical center of the roller 50. This is illustrated in Figure 1 by the dotted line C—C centered through both roller and pin 90.

As pointed out above, the particular improvement comprising this invention is directed to the manner of castering the individual rollers between toroids to increase efficiency of performance. Two specific means for achieving the desired result are disclosed herein.

The first of these is illustrated in Figures 1 and 3 where it will be observed that the shaft 72 upon which the roller is mounted for steering and tilting is positioned to one side of, or off center with respect to, the axis of rotation of the said roller. To make this clearer, and referring to these same figures, the axis of rotation of the roller is indicated by the dotted line A—A, the latter being somewhat to the left of the center line of the steering axis represented by the king pin 80 and further designated by the dotted line B—B. The greater proportion and weight of the wheel or roller is thus located to the left of the pivot pin 80. Viewing the sectional representation of Figure 3, this is even more graphically illustrated, it here appearing that the king pin 80, although forward of the axis of rotation of the roller, is also vertical, or at right angles to the plane of rotation of the opposed toroids.

The offset which has just been described has this requirement: it must lead the direction of rotation of the input toroid, with respect to the roller center, and therefore, viewing Figure 1, the offset must be to the right as there indicated, and as described above.

The alternative form of the improvement constituting this invention is illustrated in Figure 4. It has been found that a similar castering effect is obtainable if, instead of locating the supporting arm 72 to one side of the axis of rotation of the roller, the pivot or king pin 80 is inclined angularly to its vertical position as described with respect to the embodiment of Figures 1 and 3. This positioning is also graphically illustrated by reference to Figure 4 where it is seen that such king pin 80 has been inclined clockwise (viewing this figure). The initial vertical disposition (as shown in Figure 3) is represented by the dotted line X—X. The angular inclination in this version of the invention is represented by the dotted line Y—Y. Such angle of inclination to the vertical, as herein depicted, amounts to approximately 10°. Here this caster tilt may be in either direction about the roller center, and irrespective of the direction of rotation of the input toroid.

The foregoing constructions, as alternatively described, result in stabilization of the roll due to the trailing action with respect to the offset caster on the one hand, and due to the skewing (or slipping) action necessary in the tilted caster before any wobble, with its resultant oscillation, results. Such are among the prime features and benefits obtained by these castering constructions.

Mention has been made of the slot 84 and button 87 which riding in this slot functions to steer an intermediate roller to the right or left (viewing Figure 1). Such steering mechanism is remotely controlled. The immediate elements only of such control mechanism are herein described. In this respect, it is to be observed that a control ring 120 is mounted for rotation upon a hub 121 which is directly keyed or otherwise affixed to the stationary axis 10a. Anti-friction bearings 122 are interposed between control ring 120 and hub 121. At spaced intervals to coincide with positions opposite the three slots 84, the control ring 120 may be extended and apertured to receive the button 87, the latter being bolted to this structure in usual fashion. The control ring 120 may thus freely be rotated in either direction. Such rotation is remotely accomplished through a gear arrangement which directly engages the teeth 124 cut in the rim or periphery of this control ring 120. Such gearing is but diagrammatically indicated in Figure 1 at 125 and 130, the same, as well as other controls for movement of the ring being well known to the art and forming no part of this invention.

In operation of this assembly, which has just been described, it will be appreciated that if the control ring is rotated in a clockwise direction (viewing Figure 1), the pressure is brought to bear upon one side of the cam slot 84, and hence, upon the roll, so as to steer the roll in counterclockwise direction. When the ring is thus rotated the rolls are consequently first rotated about the steering pins 80 to give steering action to them, such being comparable to the steering action of the front wheels of an automobile. And when the control ring 120 is rotated in the same direction as a given toroid, the contact point of the roll surface on that toroid is steered radially inward to cause that surface to move inward on the toroid. Conversely, if the control ring 120 is rotated in a direction opposite the direction of rotation of a toroid, the contact point on that toroid is steered radially outward. In either event, the result of the initial steering action is to cause, by climbing or traction of the individual wheels, almost simultaneous "tilt" or gear ratio variation in angularity of the individual rolls about the pivot pins or axes 90.

It is characteristic of the drive from the input to the output through the rotating rolls that the input toroid necessarily rotates in a direction opposite to that of the output toroid and therefore, for motion of the control ring 120 in one direction, the contact point on one toroid is steered outward and the contact point on the other toroid is steered inward. Hence, the roll 50, for example, is initially steered in a direction to change its position and, as a direct consequence of this steering, is tilted to effectuate a change in the speed ratio between toroids.

In order that the rolls 50, 51 and 52 seek positions proportional to that of the movement of the ring 120, the slots 84, in the cam supports 75 are at such an angle (as explained supra) that as the rolls move toward their new position the amount of steering action for lateral movement of the roll (as seen in Figure 1) starts to decrease once the movement of control ring 120 is stopped. At the final position of the rolls, although tilt has been achieved, the lateral degree of steering about the axis of the king pin 80 is again zero. Thus, it appears that by rotary movement of the control ring 120 in one direction the speed ratio will be increased and in the opposite direction the speed ratio will be decreased, such movement being in proportion to the angular movement of the control ring.

The particular modes of mounting the individual and intermediate toroid rollers result in the benefits and advantages herein before described. In mechanisms of this type prompt and effective tilting action to obtain gear ratio alteration is the desideratum. Further, and as both a practical and commercial matter, if this be done consistent with economy and with increased efficiency of performance, transmissions of this type are readily adaptable to even more industrial applications. This invention, involving features of novel design, does attain such aims and advantages. Immediate and prompt tilting follows the steering action; the individual rollers are more easily controlled since each tends to more readily follow its preceding roller; control of steering and tilting is attained by mechanisms representing the essence of simplicity and therefore the over-all unit is more compact and of lighter weight; and finally, the involved control forces are reduced and the necessity of close manufacturing tolerances and close assembly alignments between each roller controlling means is eliminated.

It is apparent that other alternates and expedients may be utilized to achieve the functions and objectives of this invention; however, the scope of same is intended to be limited only to that defined in the following claims.

I claim:

1. In a toroidal type variable ratio transmission assembly having rotatable and opposed toroid friction disks with opposed friction grooves therein, said disks having parallel planes of rotation, a friction roller between said disks and in frictional engagement with said opposed grooves, said roller being provided with a mounting means permitting rotation in a plane normal to said planes of rotation of said disks at the condition of 1:1 speed ratio, means to permit tilting of said plane of rotation of said roller to change the drive ratio between said disks, said last-named means including a steering means for said roller permitting lateral pivotal movement of said roller while maintaining said normal plane relationship, said roller having a castered support to facilitate control of said roller, said support including a steering axis for said steering means, said steering axis being formed on a shaft projecting into the central portion of said roller, said axis being fixed relative to said shaft but offset from the center of said roller.

2. In a toroidal type variable ratio transmission assembly having rotatable and opposed toroid friction disks with opposed friction grooves therein, said disks having parallel planes of rotation, a friction roller between said disks and in frictional engagement with said opposed grooves, a bearing means for said roller permitting rotation thereof in a plane vertically to said planes of rotation of said disks at the condition of 1:1 speed ratio, means to permit tilting of said plane of rotation of said roller to change the drive ratio between said disks, a steering axis for said roller permitting lateral pivotal movement of said roller while maintaining said vertical plane relationship, said steering axis being formed on a shaft projecting into the central portion of said roller, said axis being fixed relative to said shaft but disposed substantially to one side of the axial center of said roller.

3. In a toroidal type variable ratio transmission assembly having rotatable and opposed toroid friction disks with opposed friction grooves therein, said disks having parallel planes of rotation, a friction roller between said disks and in frictional engagement with said opposed grooves, said roller being mounted for rotation in a plane perpendicular to said planes of rotation of said disks at the condition of 1:1 speed ratio, means to permit tilting of said plane of rotation of said roller to change the drive ratio between said disks, a steering axis for said roller permitting lateral pivotal movement of said wheel while in said 1:1 speed ratio position, the center of said steering axis being coincident with the center of rotation of said roller, said axis being fixed but angularly inclined in said perpendicular plane of rotation of said roller, whereby said roller is mounted to obtain a castering effect facilitating control and tracking thereof.

4. A toroidal type transmission as defined in claim 3, wherein said fixed but angularly inclined steering axis is inclined about 10°.

References Cited in the file of this patent

UNITED STATES PATENTS

| | | |
|---|---|---|
| 2,014,922 | Almen | Sept. 17, 1935 |
| 2,113,638 | Almen | Apr. 12, 1938 |
| 2,125,999 | Erban | Aug. 9, 1938 |